Patented Oct. 4, 1949

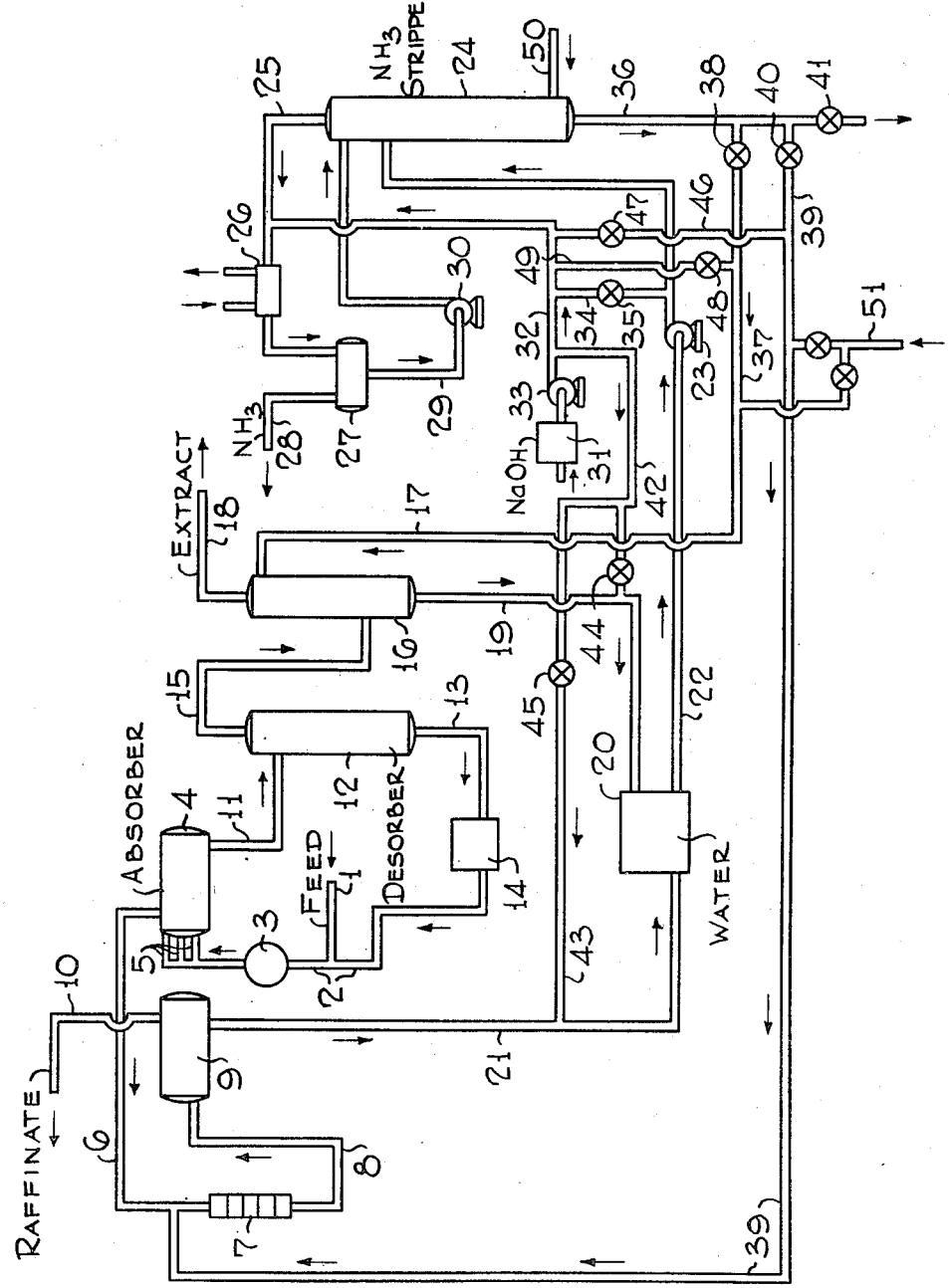

2,483,863

UNITED STATES PATENT OFFICE 2,483,863

DIOLEFIN EXTRACTION

Samuel W. Wilson, Baton Rouge, La., assignor to Standard Oil Development Company, a corporation of Delaware Application July 6, 1945, Serial No. 603,473

6 Claims. (Cl. 260—681.5)

This invention relates to improvements in diolefin extraction, and particularly to improvements in the recovery of ammonia from wash water used to remove ammonia from a diolefin obtained by heating a diolefin-cuprous ammonium acetate solution.

A diolefin, for example, butadiene, is extracted from a mixture of hydrocarbons by contacting with cuprous ammonium acetate solution. The cuprous ammonium acetate solution containing butadiene is separated from the undissolved hydrocarbons and heated to a temperature high enough to liberate and obtain, as an overhead product, butadiene. The butadiene contains, in suspension and/or solution, and/or as a gas, ammonia and ammoniacal salts, such as ammonium carbonate or carbamate, and ammonium acetate. This butadiene is then scrubbed with water to remove the ammonia and the ammonium salts. The wash solution containing ammonia is then steam-stripped in a stripping tower containing trays and bubble caps.

Due to the presence of the ammonium salts, the wash water is slightly corrosive to ferrous metal. However, upon steam-stripping to recover concentrated ammonia, the $(NH_4)_2CO_3$ and $NH_4C_2H_3O_2$ decompose and/or entrain overhead with the concentrated ammonia (about

14N $NH_4OH$)

In the more concentrated ammonia stream the rates of corrosion are accelerated both through concentration and temperature. This overhead stream passes through a set of coolers where most of the water vapor is condensed. The condensate, about 12N $NH_4OH$ plus the ammonium salts, or their decomposition products, is very corrosive and since this condensate serves as reflux to the tower, it deposits out the products of corrosion on the top trays of the tower. The apparatus used in steam-stripping the ammonia was generally closed down every 17 to 20 days for cleaning, with the loss of some 200 to 300 lbs. of ammonia per hour, as a result of the corrosion of the overhead equipment.

According to this invention, an alkali metal salt or compound, preferably sodium hydroxide, is added either to the upper portion of the stripping tower, the reflux, the feed to the tower, or to the scrubbing waters prior or subsequent to the scrubbing operation. The sodium hydroxide, when used, forms initially, or upon decomposition of the ammonium salts, stable, non-corrosive salts, both with the carbonate and/or the acetate, and it was found that the tower, when treated as described with sodium hydroxide, could be operated in excess of 150 days without cleaning and without evidence of corrosion. With the addition of sufficient sodium hydroxide to show a slight excess of free sodium hydroxide the corrosion was reduced to such a point that the reflux, which generally contained from 15 to 35 parts per million of dissolved iron, showed only 1± parts per million dissolved iron. The free sodium hydroxide was determined on ammonia-free stripper bottoms which also serves as scrubbing water.

Referring to the drawing, numeral 1 indicates a pipe through which a hydrocarbon solution containing butadiene is passed to pipe 2 through mixer 3 into an extraction plant 4 by a plurality of pipes 5. The cuprous ammonium acetate solution is passed through pipe 2, fixer 3 to extraction plant 4, through a plurality of pipes 5. The hydrocarbon mixture, substantially free of butadiene, is passed from extraction plant 4 by means of pipe 6 through a wash tower 7, pipe 8, to a water settler 9, being removed, substantially free of ammonia, through pipe 10 to storage. Ammonium cuprous acetate solution is passed from extraction plant 4 through pipe 11 to desorber 12, where it is subjected to heat to expel butadiene, and the lean cuprous acetate solution, substantially free of butadiene, is then passed through pipe 13 to ammonium cuprous acetate solution storage drum 14. The butadiene as obtained from desorber 12 is passed through pipe 15 to wash tower 16 where it is washed with water supplied by means of pipe 17 and recovered overhead through pipe 18, substantially free of ammonia or cuprous salts of ammonia. The water obtained from wash tower 16 is passed through pipe 19 to accumulator tank 20. The water recovered in water settler 9 is passed through pipe 21 also to accumulator 20. The water, containing ammonia, is then passed from accumulator 20 through pipe 22, which is supplied with pump 23, to ammonia stripper 24. Heat is applied, either externally and/or by superheated steam, in line 50, to drive the ammonia overhead by means of pipe 25, which is supplied with cooler 26, to stripper reflux drum 27, from which ammonia is removed by means of pipe 28.

The reflux water from reflux drum 27 is passed, by means of pipe 29 supplied with pump 30, to the upper part of ammonia stripper 24. Sodium hydroxide is passed from caustic storage tank 31 by means of pipe 32, supplied with pump 33, to the ammonia line 25. It may likewise be added to line 22 by means of pipe 34, which is supplied with valve 35. The water from ammonia stripper 24 is passed through pipes 36 and 37, supplied with valve 38, to scrubbing tower 16, or the water may be passed through pipes 36 and 39, supplied with valve 40, and passed to line 6, or it may be passed to the drain by means of pipe 36 supplied with valve 41. The sodium hydroxide solution may also be passed through pipes 46 and 49, supplied with valves 47 and 48, to pipes 39 and 37, respectively.

Corrosion generally attacks the metals in the upper plates of the ammonia stripper and the line 25 leading from the ammonia stripper 24, cooler 26, line 28, line 29, pump 30, and, by adding sodium hydroxide to the upper part of the stripper and the reflux or at any other point in the system, as shown in the drawing, the corrosion is materially reduced, extending the life of the ammonia stripper. Fresh scrubbing water from external sources may be added through line 51 or any other convenient point.

What I claim is:

1. The improvement in the extraction of an olefin from a mixture of hydrocarbons containing an olefin which comprises contacting ammoniacal cuprous acetate solution with a mixture of hydrocarbons containing an olefin, separating the ammoniacal cuprous acetate solution containing absorbed olefins from the undissolved hydrocarbons, washing the undissolved hydrocarbons with water, heating the ammoniacal cuprous acetate solution to recover the olefin overhead, washing the olefin with water, combining the two wash water solutions containing ammonia and ammonium acetate, adding sodium hydroxide to the combined wash water solutions in sufficient amount to provide free sodium hydroxide in the water remaining after stripping out ammonia, and stripping the combined wash water solutions with steam in iron equipment to recover ammonia overhead, whereby the corrosion of iron is substantially reduced.

2. The improvement in the extraction of butadiene from a mixture of hydrocarbons containing butadiene which comprises contacting ammoniacal cuprous acetate solution with a mixture of hydrocarbons containing butadiene, separating ammoniacal cuprous acetate solution containing absorbed butadiene from the undissolved hydrocarbons, washing the undissolved hydrocarbons with water, heating the ammoniacal cuprous acetate solution to recover overhead butadiene, washing the butadiene with a water solution, combining the two wash water solutions containing ammonia and ammonium acetate, adding sodium hydroxide to the combined wash water solutions in sufficient amount to provide free sodium hydroxide in the water remaining after stripping out ammonia, and stripping the combined wash water solutions with steam in iron equipment to recover ammonia overhead whereby the corrosion of iron is substantially reduced.

3. The improvement in the extraction of an olefin from a mixture of hydrocarbons containing said olefin, which comprises contacting ammoniacal cuprous acetate solution with said hydrocarbon mixture, separating said ammoniacal cuprous acetate solution containing absorbed olefin from the undissolved hydrocarbons, heating the separated ammoniacal cuprous acetate solution to recover the olefin overhead, washing the recovered olefin with water to remove ammonia therefrom, adding sodium hydroxide to the wash water in sufficient amount to provide free sodium hydroxide in this water after stripping of ammonia therefrom, and to retard corrosion of iron equipment in contact therewith, and stripping the wash water containing ammonia, ammonium acetate and sodium hydroxide with steam in iron equipment to recover ammonia overhead.

4. Process according to claim 3 in which said sodium hydroxide is added to said water before the washing step.

5. Process according to claim 3 in which said sodium hydroxide is added to the wash water by addition to aqueous reflux during said steam stripping step.

6. Process according to claim 3 in which said olefin is butadiene.

SAMUEL W. WILSON.

REFERENCES CITED

The following references are of record in the file of this patent:

UNITED STATES PATENTS

| Number | Name | Date |
| --- | --- | --- |
| 2,156,843 | Garrels et al. | May 2, 1939 |
| 2,222,559 | Boeckler | Nov. 19, 1940 |
| 2,383,784 | Fleer | Aug. 28, 1945 |
| 2,401,896 | Asbury et al. | June 11, 1946 |
| 2,417,048 | Antonio | Mar. 11, 1947 |

OTHER REFERENCES

Treadwell et al., Analytical Chem., 7th ed. (1930), page 92.

Chem. & Met. Eng., Sept. 1944, pages 96, 97, 98 and 110.